US012807097B2

(12) United States Patent
Cunningham et al.

(10) Patent No.: US 12,807,097 B2
(45) Date of Patent: Nov. 24, 2026

(54) COMBINED FRUNK AND WASHER FLUID RESERVOIR

(71) Applicant: GM GLOBAL TECHNOLOGY OPERATIONS LLC, Detroit, MI (US)

(72) Inventors: Chad R. Cunningham, Shelby Township, MI (US); Caleb Omeiza Audu, Rochester Hills, MI (US); Bradley T. Gerwatowski, South Lyon, MI (US); James C. O'Kane, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 227 days.

(21) Appl. No.: 18/797,051

(22) Filed: Aug. 7, 2024

(65) Prior Publication Data

US 2026/0042426 A1 Feb. 12, 2026

(51) Int. Cl.
*B60S 1/50* (2006.01)
*B62D 25/08* (2006.01)

(52) U.S. Cl.
CPC .............. *B60S 1/50* (2013.01); *B62D 25/087* (2013.01)

(58) Field of Classification Search
CPC ...... B60R 5/02; B60S 1/48; B60S 1/50; B60S 1/566; B62D 25/082; B62D 25/087
See application file for complete search history.

(56) References Cited

U.S. PATENT DOCUMENTS

2018/0037150 A1 2/2018 Rotharmel
2021/0284242 A1 9/2021 Yamaoka

FOREIGN PATENT DOCUMENTS

DE 102018206316 A1 10/2019
DE 102020128579 A1 5/2022
DE 102023001757 B3 5/2024
WO WO-2022090375 A1 * 5/2022 .............. B60L 53/18

OTHER PUBLICATIONS

German Office Action from counterpart DE1020241286792, dated Jan. 13, 2025.

* cited by examiner

*Primary Examiner* — Lori Lyjak

(57) ABSTRACT

A frunk system for a vehicle including a first shell member including a base wall having an inner surface and an outer surface, and a plurality of side walls that form a washer fluid reservoir. A liquid fill spout is fluidically connected to the washer fluid reservoir. A second shell member is mated with the first shell member. The second shell member includes a base wall portion having an inner surface portion and an outer surface portion, and a plurality of side wall portions that collectively define an article storage zone that extends into the washer fluid reservoir. The second shell member is sealed to the first shell member. The outer surface of the base wall includes a plurality of resilient mounting members that support the frunk system in the vehicle.

20 Claims, 4 Drawing Sheets

COMBINED FRUNK AND WASHER FLUID RESERVOIR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to the art of vehicles having a front trunks or frunks and, more particularly, to a combined frunk and washer fluid reservoir for a vehicle.

Most vehicles include a passenger compartment, a motor compartment, and a storage area. The storage area is often used for stowing spare tires, tools, luggage, groceries, and/or the like. The storage area may take the form of a rear compartment or "trunk", a front trunk or "frunk", or an eTrunk. The trunk is often arranged at or aft of rear wheels of the vehicle. In some cases, the trunk is positioned over or behind a gas tank for the vehicle. Conversely, the frunk is typically positioned between front wheels of the vehicle.

Whether a vehicle is provided with a trunk, or a frunk is largely dependent upon powertrain selection. Vehicles in which the motor is located forward of the passenger compartment are provided with a trunk. Vehicles in which the motor is located aft of the passenger compartment are provided with a frunk. In either case, the storage area is provided with a hatch or cover that secures items stowed in the trunk or frunk.

SUMMARY

A frunk system for a vehicle, in accordance with the present disclosure, includes a first shell member including a base wall having an inner surface and an outer surface, and a plurality of side walls that form a washer fluid reservoir. A liquid fill spout is fluidically connected to the washer fluid reservoir. A second shell member is mated with the first shell member. The second shell member includes a base wall portion having an inner surface portion and an outer surface portion, and a plurality of side wall portions that collectively define an article storage zone that extends into the washer fluid reservoir. The second shell member is sealed to the first shell member. The outer surface of the base wall includes a plurality of resilient mounting members that support the frunk system in the vehicle.

In other features, the liquid fill spout being fluidically connected to the washer fluid reservoir.

In other features, an insulating barrier is provided between the first shell member and the second shell member.

In other features, the insulating barrier is a rubber seal provided about the base wall portion of the second shell member.

In other features, the rubber seal extends around the base wall portion along one of the plurality of side wall portions of the second shell member.

In other features, at least one of the inner surface and the outer surface supports a plurality of ribs that extends into the washer fluid reservoir.

In other features, the inner surface of the base wall includes a first plurality of ribs that extend into the washer fluid reservoir and the outer surface of the base wall portion includes a second plurality of ribs that extend into the washer fluid reservoir.

In other features, the first plurality of ribs is interleaved with the second plurality of ribs to form a serpentine flow path across the washer fluid reservoir.

In other features, a washer fluid pump is fluidically connected to the washer fluid reservoir.

In other features, a liquid drain extends from the article storage zone through the washer fluid reservoir, the liquid drain being configured to selectively release fluid from the article storage zone.

A vehicle, in accordance with a non-limiting example, includes a body defining, in part, a passenger compartment. A hood is arranged forward of the passenger compartment. A frunk system is arranged forward of the passenger compartment and selectively covered by the hood. The frunk system includes a first shell member including a base wall and a plurality of side walls that form a washer fluid reservoir, and a second shell member mated with the first shell member. The second shell member includes a base wall portion and a plurality of side wall portions that collectively define an article storage zone that extends into the washer fluid reservoir. The second shell member is sealed to the first shell member.

In other features, a liquid fill spout is connected to one of the plurality of side walls of the first shell member, the liquid fill spout being fluidically connected to the washer fluid reservoir.

In other features, an insulating barrier is provided between the first shell member and the second shell member.

In other features, the insulating barrier is a rubber seal provided about the base wall portion of the second shell member.

In other features, the rubber seal extends about the base wall portion along one of the plurality of side wall portions of the second shell member.

In other features, the base wall includes an inner surface and an outer surface, and the base wall portion includes an inner surface portion and an outer surface portion, at least one of the inner surface and the outer surface supports a plurality of ribs that extends into the washer fluid reservoir.

In other features, the inner surface of the base wall includes a first plurality of ribs that extend into the washer fluid reservoir and the outer surface of the base wall portion includes a second plurality of ribs that extend into the washer fluid reservoir.

In other features, the first plurality of ribs is interleaved with the second plurality of ribs to form a serpentine flow path across the washer fluid reservoir.

In other features, a washer fluid pump fluidically connected to the washer fluid reservoir.

In other features, a liquid drain extending from the article storage zone through the washer fluid reservoir, the liquid drain being configured to selectively release fluid from the article storage zone.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
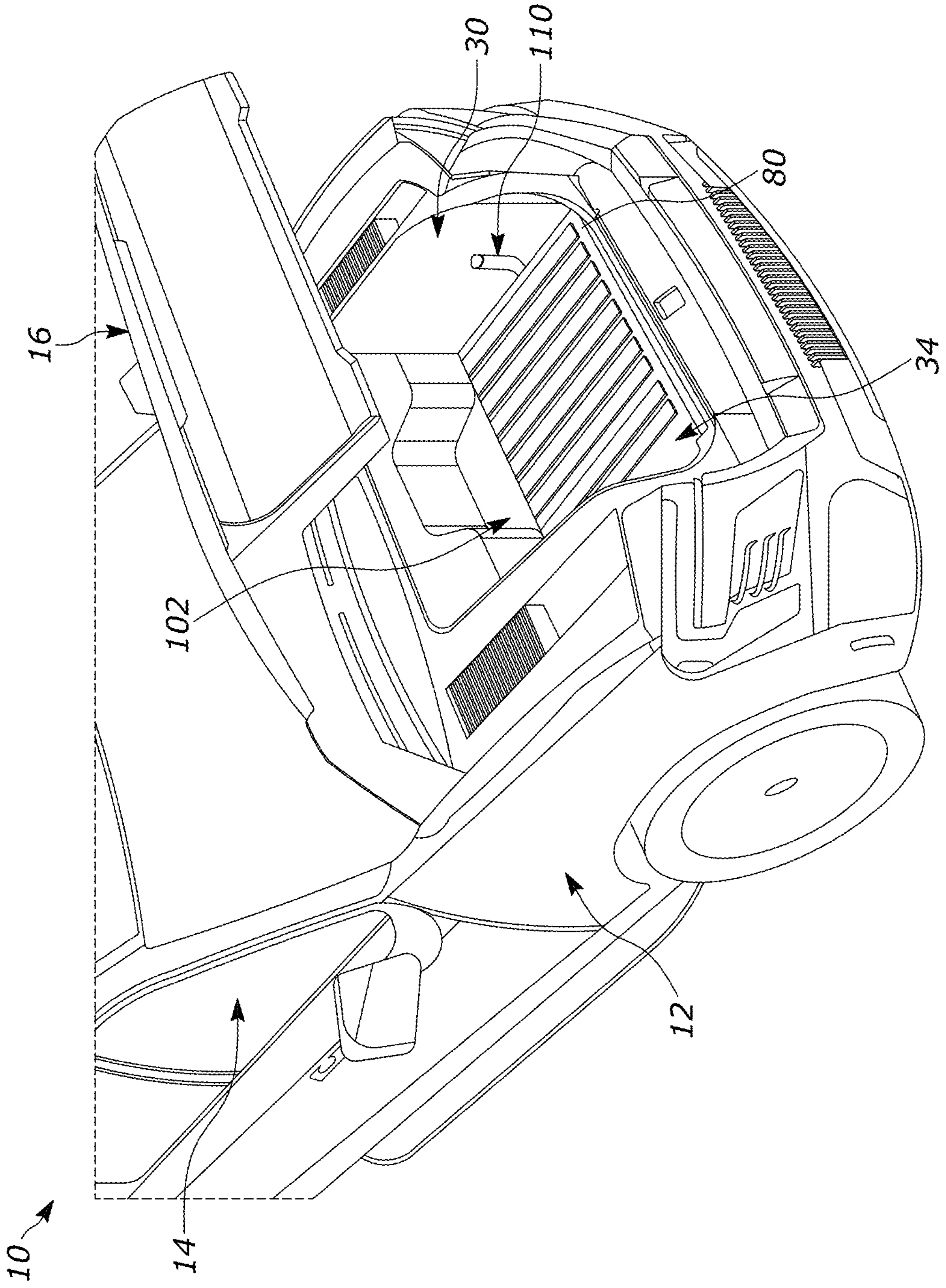
FIG. 1 is an upper right perspective view of a vehicle including a frunk system having a combined frunk and washer fluid reservoir, in accordance with the present disclosure.

Modern vehicles include many surfaces that require periodic and, often times, in motion cleaning. In addition to directing washing fluid towards a windshield, washing fluid may also be directed towards mirror surfaces, camera surfaces, and/or sensor surfaces. The large number of additional surfaces require more washing fluid than is typically provided for in a vehicle. Adding a large reservoir to the forward portion of a vehicle is challenging particularly for vehicles that include a frunk or forward storage area. Combining the frunk and the washer fluid reservoir as described herein provides a solution for carrying a large volume of washer fluid without adversely affecting storage space.

A vehicle, in accordance with the present disclosure, is indicated generally at 10. Vehicle 10 includes a body 12 defining, in part, a passenger compartment 14. Vehicle 10 includes a hood 16 pivotally mounted to body 12 forward of passenger compartment 14. Hood 16 selectively covers a frunk system 30. Frunk system 30, as will become more fully evident herein, defines a forward storage compartment for vehicle 10. Aspects of the present disclosure may apply to various powertrain systems including internal combustion engines, hybrid vehicles, and electric vehicles.

Figure 2:
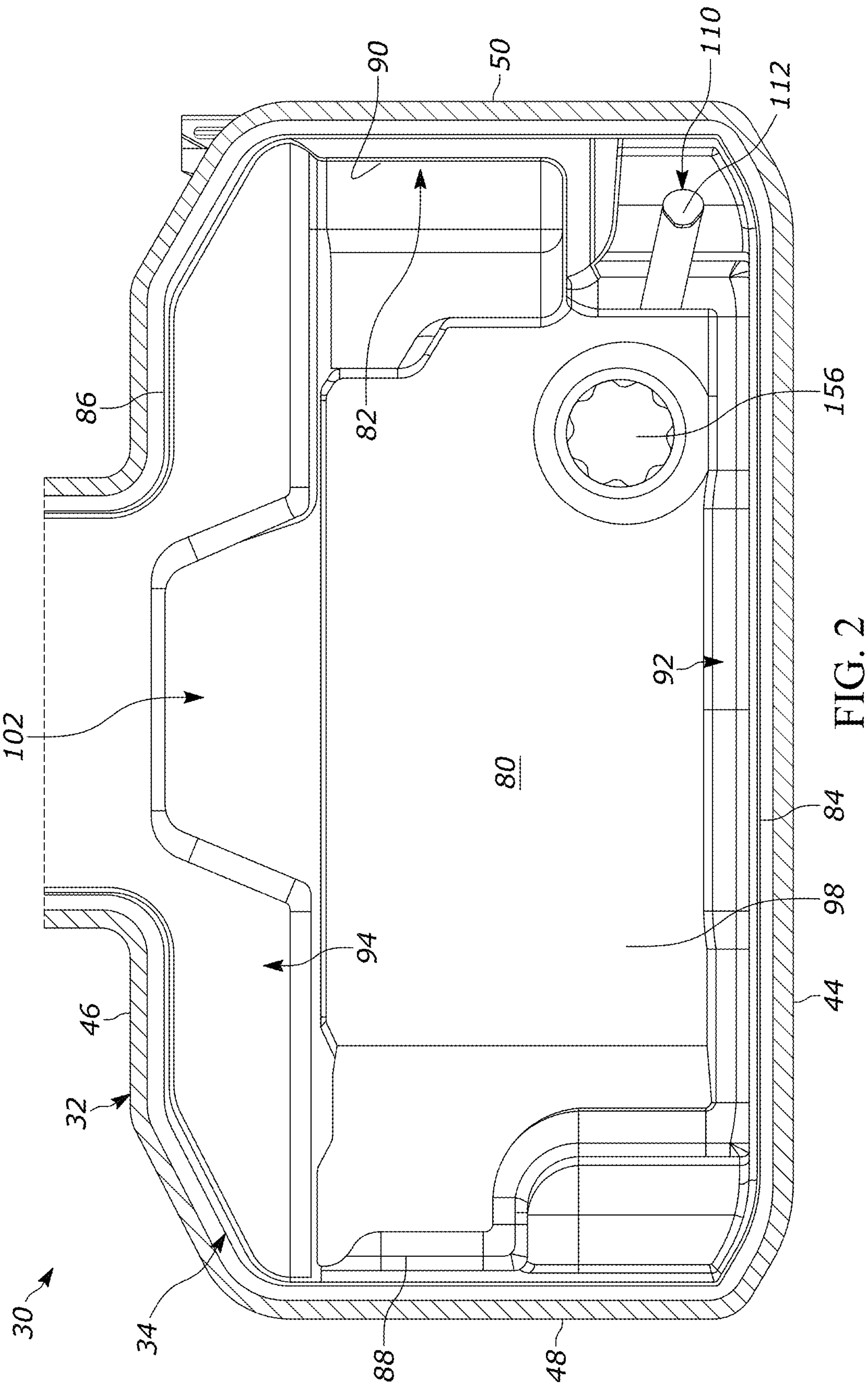
FIG. 2 is a top plan view of the frunk system of FIG. 1, in accordance with the present disclosure.
Figure 3:
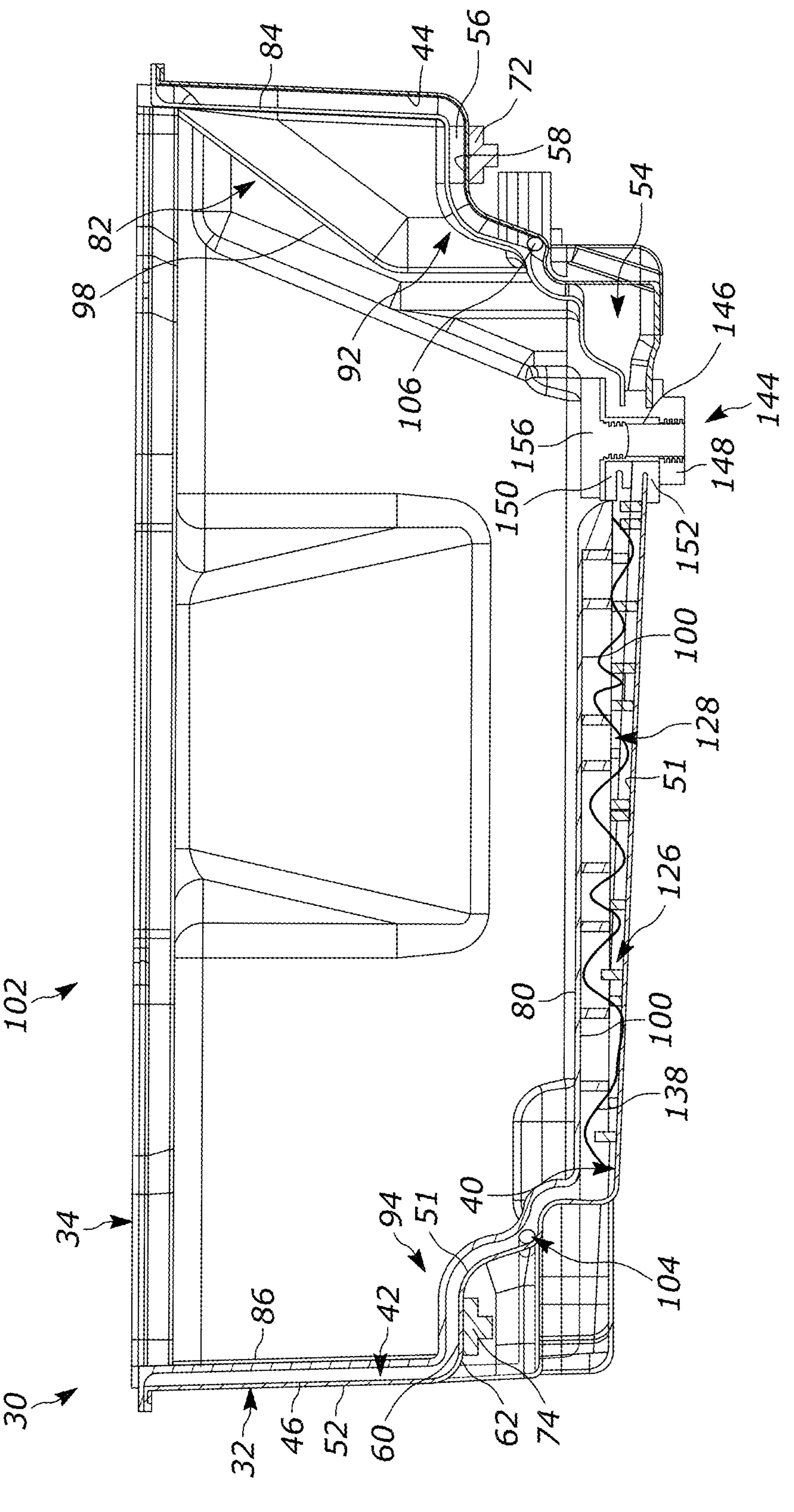
FIG. 3 is a cross-sectional side view of the frunk system of FIG. 2, in accordance with the present disclosure.

Referring to FIGS. 2 and 3 and with continued reference to FIG. 1, frunk system 30 includes a first shell member 32 and a second shell member 34. Second shell member 34 is nested within first shell member 32. First shell member 32 includes a base wall or bottom surface 40, and a plurality of side walls 42. The plurality of side walls 42 includes a front side wall 44, a rear side wall 46, a first lateral side wall 48, and a second lateral side wall 50. First shell member 32 includes an inner surface 51 and an outer surface 52. Inner surface 51 of base wall 40 and the plurality of side walls 42 define a washer fluid reservoir 54.

Figure 4:
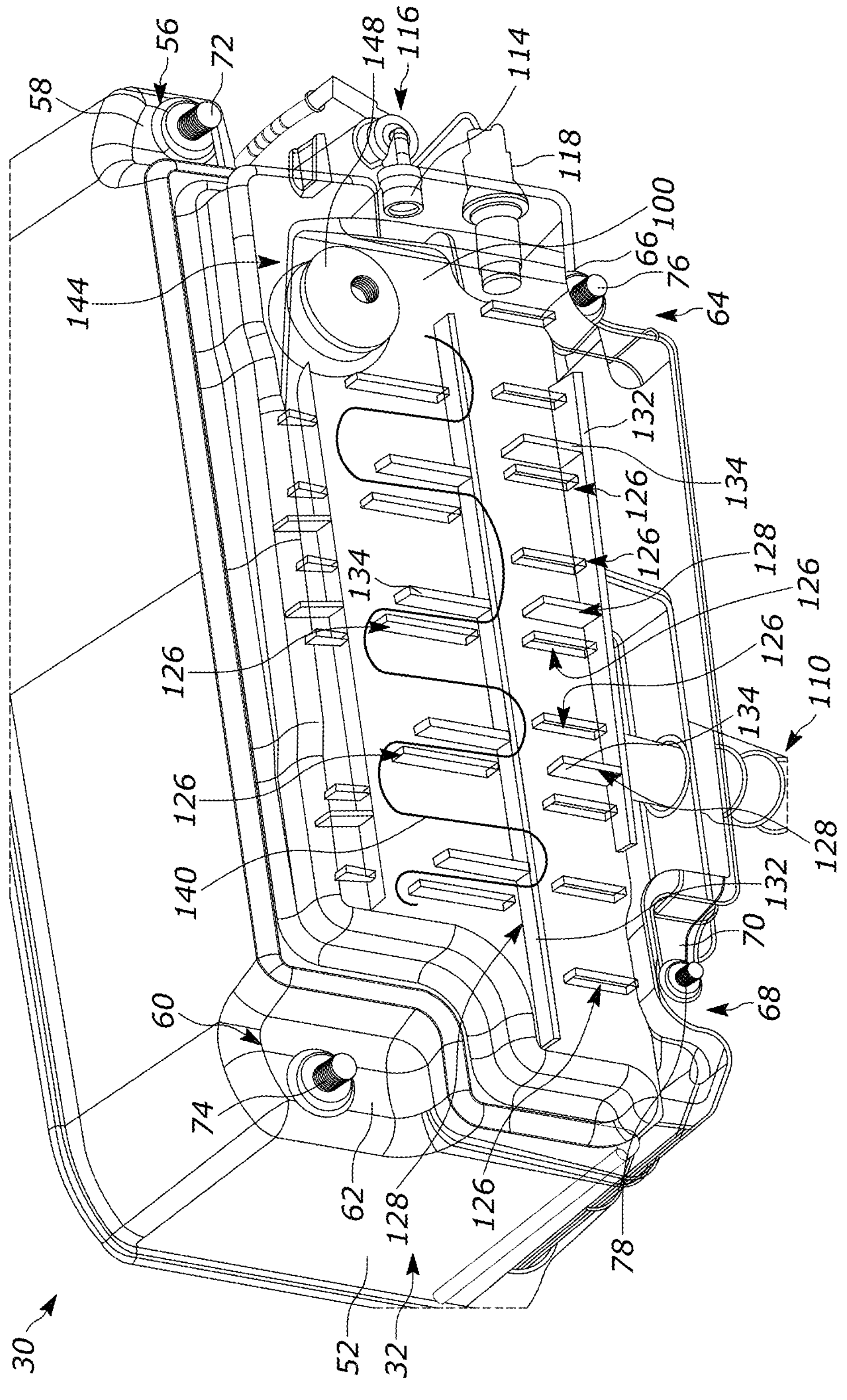
FIG. 4 is a bottom perspective glass view of the frunk system of FIG. 3, in accordance with the present disclosure.

Referring to FIGS. 3 and 4, front side wall 44 includes a first recess 56 forming a first support surface 58 and rear side wall 46 includes a second recess 60 forming a second support surface 62, a third recess 64 forming a third support surface 66, and a fourth recess 68 forming a fourth support surface 70. A first resilient mounting member 72 is arranged on first support surface 58, a second resilient mounting member 74 is arranged in second support surface 62, a third resilient mounting member 76 is arranged on third support surface 66, and a fourth resilient mounting member 78 is arranged on fourth support surface 70.

First resilient mounting member 72, second resilient mounting member 74, third resilient mounting member 76, and fourth resilient mounting member 78, may take on various forms including rubber mounts, elastomer mounts, silicone mounts, spring-based mounts, or other devices that can provide support as well as vibration isolation. That is, in addition to supporting frunk system 30 in body 12, the resilient mounting members also provide a vibration isolating function. That is, first resilient mounting member 72, second resilient mounting member 74, third resilient mounting member 76, and fourth resilient mounting member 78 isolate vibrations that might be caused by movement of washer fluid in washer fluid reservoir 54 from passing into passenger compartment 15 and being perceived by passengers.

Referring to FIG. 3 and with continued reference to FIG. 2, second shell member 34 includes a base wall portion 80 and a plurality of side wall portions 82. The plurality of side wall portions 82 includes a front side wall portion 84, a rear side wall portion 86, a first lateral side wall portion 88, and a second lateral side wall portion 90. Front side wall portion 84 includes a first step member 92 and rear side wall portion 86 includes a second step member 94. First step member 92 and second step member 94 nest with first recess 56 and second recess 60 when second shell member 34 is placed in first shell member 32. Second shell member 34 includes an inner surface portion 98 and an outer surface portion 100. Inner surface portion 98 of base wall portion 80 and the plurality of side wall portions 82 define an article or cargo storage zone 102. Outer surface portion 100 of base wall portion 80 and the plurality of side wall portions 82 form part of washer fluid reservoir 54.

In accordance with the present disclosure illustrated in FIG. 3, frunk system 30 includes an insulating barrier 104 that is arranged between first shell member 32 and second shell member 34. Insulating barrier 104 isolates washer fluid in washer fluid reservoir from cold temperatures that may exist in cargo storage zone 102. Insulating barrier 104 is shown in the form of a rubber seal 106 that extends about inner surface 51 of washer fluid reservoir 54. As shown in FIG. 3, rubber seal 106 resides between first recess 56 and first step member 92 and second recess 60 and second step member 94 forming a temperature isolating interface between inner surface 51 of first shell member 32 and outer surface portion 100 of second shell member 34 in order to prevent freezing of washer fluid in washer fluid reservoir 54.

Referring to FIG. 4, first shell member 32 includes a liquid fill spout 110 extending outwardly from rear side wall 46. The particular location of liquid fill spout 110 may vary depending on vehicle model and design and should not be considered to be limited to being arranged on rear side wall. In the example shown, fill spout 110 is routed to second lateral side wall 50 as shown in FIG. 2 and is provided with an inlet 112. First shell member 32 is also shown to include an outlet 114 connected to a washer pump 116. Washer pump 116 is selectively activated to deliver washer fluid from washer fluid reservoir onto a selected surface to be washed. The selected surface may be a window, a mirror, a lidar sensor, a radar sensor, or the like. The particular selected surface being washed may vary depending on vehicle model and selected vehicle features. Second shell member 34 is also shown to support a washer fluid sensor 118 that provides feedback to vehicle occupants regarding washer fluid level in washer fluid reservoir 54.

With continued reference to FIG. 4, in accordance with the present disclosure, first shell member 32 includes a first plurality of ribs 126 that project upwardly from inner surface 51 of base wall 40. Second shell member 34 includes a second plurality of ribs 128 that project downward from outer surface portion 100 of base wall portion 80. First plurality of ribs 126 and second plurality of ribs 128 provide barriers to fluid flow in washer fluid reservoir 54 that are positioned to reduce sloshing and associated noise. Reducing noise associated with fluid sloshing in washer fluid reservoir 54 enhances a passenger's experience in vehicle 10.

The second plurality of ribs 128, in accordance with an aspect of the present disclosure, includes a first plurality of rib elements 132 and a second plurality of rib elements 134. Each of the first plurality of rib elements 132 extend from outer surface portion 100 of base wall portion 80 between front side wall portion 84 and rear side wall portion 86 forming a plurality of channels (not separately labeled). The second plurality of rib elements 134 extend from base wall portion 80 between adjacent ones of the first plurality of rib elements 132.

In accordance with the present disclosure, the second plurality of rib elements 134 interleave with the first plurality of ribs 126 that project upward from base wall 40 of first shell member 32. With this arrangement, first plurality of ribs 126 and second plurality of ribs 128 establish a first serpentine flow path 138 (FIG. 3) and a second serpentine flow path 140 (FIG. 4) in washer fluid reservoir 54. First serpentine flow path 138 and second serpentine flow path 140 slow movement of fluid in washer fluid reservoir 54 in order to reduce sloshing that may be caused by turning, sudden accelerations and/or sudden decelerations.

In accordance with the present disclosure, cargo storage zone 102 in addition to storing cargo, may serve as an ice chest during a tailgating party or other function. In this regard, second shell member 34 includes a liquid drain 144 that extends though first shell member 32 to ambient. As shown in FIGS. 2 and 3, liquid drain 144 includes a drain spout 146 that is secured to first shell member 32 with a threaded fastener 148. A first seal 150 prevents fluid from cargo storage zone 102 from leaking into washer fluid reservoir 54 and a second seal 152 prevents liquid from escaping washer fluid reservoir 54 along drain spout 146 to ambient. A drain plug 156 arranged in base wall portion 80 in cargo storage zone 102 ensures that liquid remains in second shell member 34 until draining is desired.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A frunk system for a vehicle comprising:

a first shell member including a base wall having an inner surface and an outer surface, and a plurality of side walls that form a washer fluid reservoir;

a liquid fill spout fluidically connected to the washer fluid reservoir;

a second shell member mated with the first shell member, the second shell member including a base wall portion having an inner surface portion and an outer surface portion, and a plurality of side wall portions that collectively define an article storage zone that extends into the washer fluid reservoir, the second shell member being sealed to the first shell member, wherein the outer surface of the base wall includes a plurality of resilient mounting members that support the frunk system in the vehicle; and an insulating barrier provided between the first shell member and the second shell member, wherein the insulating barrier is a rubber seal provided about the base wall portion of the second shell member.

2. The frunk system according to claim 1, wherein the liquid fill spout is connected to one of the plurality of side walls of the first shell member.

3. The frunk system according to claim 1, wherein the rubber seal extends around the base wall portion along one of the plurality of side wall portions of the second shell member.

4. The frunk system according to claim 1, wherein at least one of the inner surface and the outer surface supports a plurality of ribs that extend into the washer fluid reservoir.

5. The frunk system according to claim 4, wherein the inner surface of the base wall includes a first plurality of ribs that extend into the washer fluid reservoir and the outer surface of the base wall portion includes a second plurality of ribs that extend into the washer fluid reservoir.

6. The frunk system according to claim 5, wherein the first plurality of ribs is interleaved with the second plurality of ribs to form a serpentine flow path across the washer fluid reservoir.

7. The frunk system according to claim 1, further comprising: a washer fluid pump fluidically connected to the washer fluid reservoir.

8. The frunk system according to claim 1, further comprising: a liquid drain extending from the article storage zone through the washer fluid reservoir, the liquid drain being configured to selectively release fluid from the article storage zone.

9. A vehicle comprising:

a body defining, in part, a passenger compartment;

a hood arranged forward of the passenger compartment; and a frunk system arranged forward of the passenger compartment and selectively covered by the hood, the frunk system comprising:

a first shell member including a base wall and a plurality of side walls that form a washer fluid reservoir;

a second shell member mated with the first shell member, the second shell member including a base wall portion and a plurality of side wall portions that collectively define an article storage zone that extends into the washer fluid reservoir, the second shell member being sealed to the first shell member; and an insulating barrier provided between the first shell member and the second shell member, wherein the insulating barrier is a rubber seal provided about the base wall portion of the second shell member.

10. The vehicle according to claim 9, further comprising: a liquid fill spout connected to one of the plurality of side walls of the first shell member, the liquid fill spout being fluidically connected to the washer fluid reservoir.

11. The vehicle according to claim 9, wherein the rubber seal extends about the base wall portion along one of the plurality of side wall portions of the second shell member.

12. The vehicle according to claim 9, wherein the base wall includes an inner surface and an outer surface, and the base wall portion includes an inner surface portion and an outer surface portion, at least one of the inner surface and the outer surface supports a plurality of ribs that extends into the washer fluid reservoir.

13. The vehicle according to claim 12, wherein the inner surface of the base wall includes a first plurality of ribs that extend into the washer fluid reservoir and the outer surface of the base wall portion includes a second plurality of ribs that extend into the washer fluid reservoir.

14. The vehicle according to claim 13, wherein the first plurality of ribs is interleaved with the second plurality of ribs to form a serpentine flow path across the washer fluid reservoir.

15. The vehicle according to claim 9, further comprising: a washer fluid pump fluidically connected to the washer fluid reservoir.

16. The vehicle according to claim 9, further comprising: a liquid drain extending from the article storage zone through the washer fluid reservoir, the liquid drain being configured to selectively release fluid from the article storage zone.

17. The frunk system according to claim 8, wherein the liquid drain is fluidically isolated from the washer fluid reservoir.

18. The frunk system according to claim 17, wherein the liquid drain includes a first seal configured to prevent fluid in the article storage zone from leaking into the washer fluid reservoir and a second seal that is configured to prevent liquid from escaping the washer fluid reservoir to ambient.

19. The vehicle according to claim 16, wherein the liquid drain includes a first seal configured to prevent fluid in the article storage zone from leaking into the washer fluid reservoir and a second seal that is configured to prevent liquid from escaping the washer fluid reservoir to ambient.

20. A frunk system for a vehicle comprising:

a first shell member including a base wall having an inner surface and an outer surface, and a plurality of side walls that form a washer fluid reservoir;

a liquid fill spout fluidically connected to the washer fluid reservoir; and a second shell member mated with the first shell member, the second shell member including a base wall portion having an inner surface portion and an outer surface portion, and a plurality of side wall portions that collectively define an article storage zone that extends into the washer fluid reservoir, the second shell member being sealed to the first shell member, wherein the outer surface of the base wall includes a plurality of resilient mounting members that support the frunk system in the vehicle; and a liquid drain extending from the article storage zone through the washer fluid reservoir, the liquid drain being configured to selectively release fluid from the article storage zone.

* * * * *